(12) United States Patent
Isobe et al.

(10) Patent No.: US 11,958,118 B2
(45) Date of Patent: Apr. 16, 2024

(54) INSERT AND CUTTING TOOL

(71) Applicant: KYOCERA CORPORATION, Kyoto (JP)

(72) Inventors: Futoshi Isobe, Satsumasendai (JP); Hiroyuki Nanahara, Satsumasendai (JP); Yusuke Nagaoka, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/003,317

(22) PCT Filed: Jun. 23, 2021

(86) PCT No.: PCT/JP2021/023830
§ 371 (c)(1),
(2) Date: Dec. 26, 2022

(87) PCT Pub. No.: WO2022/004530
PCT Pub. Date: Jan. 6, 2022

(65) Prior Publication Data
US 2023/0249261 A1    Aug. 10, 2023

(30) Foreign Application Priority Data

Jun. 30, 2020 (JP) .................................. 2020-112454

(51) Int. Cl.
*C04B 35/5831* (2006.01)
*B23B 27/14* (2006.01)
*C22C 29/16* (2006.01)

(52) U.S. Cl.
CPC ........ *B23B 27/148* (2013.01); *C04B 35/5831* (2013.01); *C22C 29/16* (2013.01);
(Continued)

(58) Field of Classification Search
CPC ................ C22C 29/16; C04B 35/5831; C04B 2235/3217; C04B 2235/3865; B23B 2226/125
(Continued)

(56) References Cited

U.S. PATENT DOCUMENTS

2010/0313489 A1* 12/2010 Teramoto ............ C04B 35/4885
51/309
2017/0362130 A1* 12/2017 Hirano ................ C04B 35/6262
2019/0111495 A1    4/2019 Maekawa et al.

FOREIGN PATENT DOCUMENTS

JP        2012179674 A    9/2012
JP        2013107154 A    6/2013
(Continued)

*Primary Examiner* — Katherine A Christy
(74) *Attorney, Agent, or Firm* — HAUPTMAN HAM, LLP

(57) ABSTRACT

An insert includes a cBN sintered compact including cBN particles and a binder phase binding the cBN particles. The cBN particles occupy 60% or more of the cross-sectional area of the cBN sintered compact. The binder phase contains Al compound particles containing at least one of AlN or $Al_2O_3$. A particle distribution of the Al compound particles in a cumulative distribution based on the number of the Al compound particles in a cross section of the cBN sintered compact is as follows. The proportion of the Al compound particles with the particle diameter of 0.3 μm or larger is 5% or more, and the proportion of the Al compound particles with the particle diameter of 0.5 μm or larger is less than 5%.

6 Claims, 11 Drawing Sheets

(52) U.S. Cl.
CPC . *B23B 2226/125* (2013.01); *C04B 2235/3217* (2013.01); *C04B 2235/3865* (2013.01)

(58) Field of Classification Search
USPC .......................................................... 428/698
See application file for complete search history.

(56) References Cited

FOREIGN PATENT DOCUMENTS

| | | | |
|---|---|---|---|
| JP | 2017159445 | A | 9/2017 |
| JP | 2019172477 | A | 10/2019 |

* cited by examiner

| Sample | AVERAGE PARTICLE DIAMETER (μm) | AREA PERCENTAGE (%) | cBN AREA RATIO (%) | CULMINATION OF 0.3 μm OR LARGER (%) | CULMINATION OF 0.5 μm OR LARGER (%) |
|---|---|---|---|---|---|
| No.1 | 0.15 | 6.065 | 68.1 | 10.8 | 1.6 |
| No.2 | 0.12 | 4.553 | 71.1 | 5.5 | 0.4 |
| No.3 | 0.10 | 2.892 | 70.7 | 0.87 | 0.14 |
| No.4 | 0.18 | 8.345 | 69.2 | 13.5 | 9.3 |

FIG. 19

| Sample | WEAR RESISTANCE EVALUATION (min) | STABILITY EVALUATION (TIMES) |
|---|---|---|
| No.1 | 38.6 | 25300 |
| No.2 | 35 | 21500 |
| No.3 | 30.8 | 19100 |
| No.4 | 23.1 | 4800 |

FIG. 20

INSERT AND CUTTING TOOL

CROSS-REFERENCE TO RELATED APPLICATION(S)

This application is a national stage application of International Application No. PCT/JP2021/023830, filed on Jun. 23, 2021, which designates the United States, and which is based upon and claims the benefit of priority to Japanese Patent Application No. 2020-112454, filed on Jun. 30, 2020.

TECHNICAL FIELD

The present disclosure relates to an insert and a cutting tool.

BACKGROUND OF INVENTION

Cubic boron nitride (cBN) is harder than anything other than diamond, and features excellent chemical stability. Therefore, a cBN sintered compact has been widely used as a cutting tool for processing ferrous metal such as hardened steel, cast iron, and sintered alloy.

CITATION LIST

Patent Literature

Patent Document 1: JP 2019-172477 A

SUMMARY

An insert according to an aspect of the present disclosure includes a cBN sintered compact in which a plurality of cBN particles is bound via a binder phase. The plurality of cBN particles occupies 60% or more of the cross-sectional area of the cBN sintered compact. The binder phase contains Al compound particles containing at least one of AlN or $Al_2O_3$. A particle distribution of the Al compound particles in a cumulative distribution based on the number of the Al compound particles in a cross section of the cBN sintered compact is as follows. Specifically, the proportion of the Al compound particles with the particle diameter of 0.3 μm or larger is 5% or more, and the proportion of the Al compound particles with the particle diameter of 0.5 μm or larger is less than 5%.

BRIEF DESCRIPTION OF THE DRAWINGS

FIG. 19 is a table showing results of analyzing the cross-sectional structure of each sample.

FIG. 20 is a table showing results of evaluation on abrasion resistance and stability of each sample.

DESCRIPTION OF EMBODIMENTS

The following is a detailed description of an insert and a cutting tool according to the present disclosure (hereinafter referred to as "embodiments") with reference to the drawings. Note that the embodiments are not intended to limit the cutting tool according to the present disclosure. In addition, embodiments can be appropriately combined so as not to contradict each other in terms of content. In the following embodiments, the same portions are denoted by the same reference signs, and overlapping explanations are omitted.

In the embodiments described below, expressions such as "constant", "orthogonal", "vertical", and "parallel" may be used, but these expressions do not need to be exactly "constant", "orthogonal", "vertical", and "parallel". In other words, each of the above-described expressions allows for deviations in, for example, manufacturing accuracy, positioning accuracy, and the like.

Since cBN is difficult to sinter, in one known method of obtaining a cBN sintered compact, ceramic particles serving as a sintering aid is added to boron nitride particles. When the sintering aid contains aluminum (Al), aluminum nitride (AlN) may be contained in the cBN sintered compact. It is known that AlN has relatively inferior mechanical properties.

The present disclosure provides an insert and a cutting tool featuring excellent mechanical properties.

Insert

Figure 1:
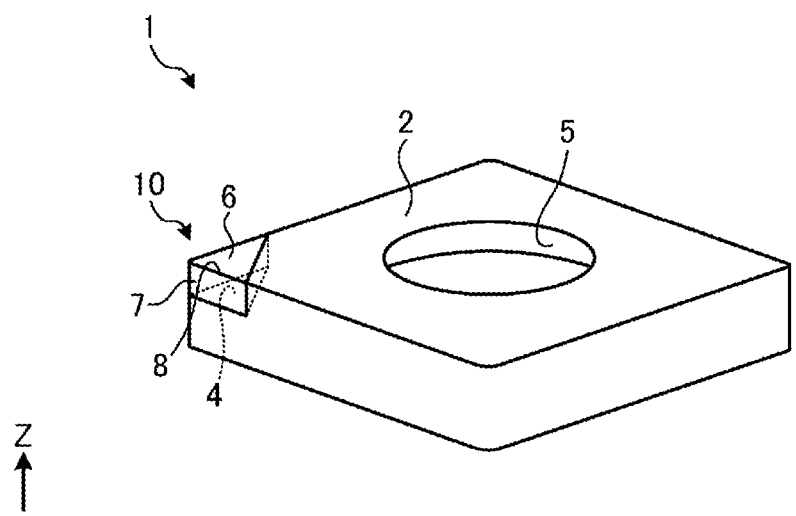
FIG. 1 is a perspective view illustrating an example of an insert according to an embodiment.

FIG. 1 is a perspective view illustrating an example of an insert according to an embodiment. As illustrated in FIG. 1, the insert 1 according to the embodiment is an insert for a cutting tool and has a hexahedral shape in which a shape of an upper surface and a lower surface (a surface intersecting the Z-axis illustrated in FIG. 1) is a parallelogram, for example.

The insert 1 according to the embodiment includes a body portion 2 and a base 10 attached to the body portion 2 via a bonding material 40 described later (see FIG. 2).

The body portion 2 is formed of, for example, cemented carbide. The cemented carbide contains tungsten (W), specifically, tungsten carbide (WC). Further, the cemented carbide may contain nickel (Ni) or cobalt (Co). Alternatively, the body portion 2 may be formed of a cermet. The cermet contains, for example, titanium (Ti), specifically, titanium carbide (TiC) or titanium nitride (TiN). Furthermore, the cermet may contain Ni or Co.

A seat 4 for attaching the base 10 is located in an end portion of the body portion 2. A through hole 5 that vertically penetrates the body portion 2 is located in the center portion of the body portion 2. A screw 75 for attaching the insert 1 to a holder 70 described later is inserted into the through hole 5 (see FIG. 4).

The base 10 is attached to the seat 4 of the body portion 2. As a result, the base 10 is integrated with the body portion 2.

The base 10 has a first surface 6 (here, an upper surface) and a second surface 7 (here, a side surface) that is connected to the first surface 6. In the embodiment, the first surface 6 functions as a "rake face" for scooping chips generated by cutting, and the second surface 7 functions as a "flank face". A cutting edge 8 is located on at least a part of a ridge line where the first surface 6 and the second surface 7 intersect with each other, and the insert 1 cuts a workpiece through application of the cutting edge 8 against the workpiece.

The base 10 is a cubic boron nitride (cBN) sintered compact (hereinafter referred to as "cBN sintered compact"), in which a plurality of cBN particles is bound via a binder phase. The specific configuration of the base 10 will be described later.

Figure 2:
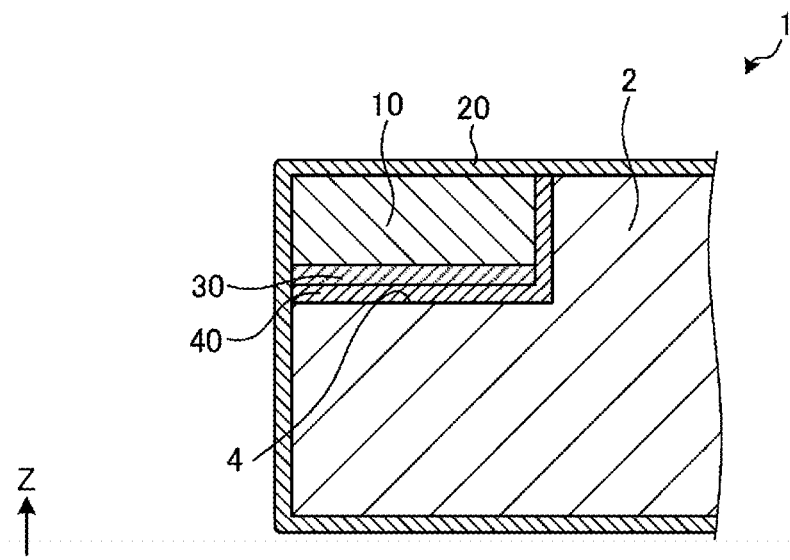
FIG. 2 is a side cross-sectional view illustrating an example of the insert according to the embodiment.

FIG. 2 is a side cross-sectional view illustrating an example of the insert 1 according to the embodiment. A substrate 30 made from, for example, cemented carbide or cermet may be located on the lower surface of the base 10 as illustrated in FIG. 2. In this case, the base 10 is bound to the seat 4 of the body portion 2 via the substrate 30 and a bonding material 40. The bonding material 40 is, for example, a brazing material. In a portion other than the seat 4 of the body portion 2, the base 10 may be bound to the body portion 2 via the bonding material 40.

Note that, in the embodiment, only the base 10 that is a part of the insert 1 is formed by the cBN sintered compact, but the entire insert may be formed by the cBN sintered compact.

The base 10 may be covered by a coating film 20. The coating film 20 is coated on the base body 10 for the purpose of, for example, improving wear resistance, heat resistance, etc. of the base body 10. In the example in FIG. 2, the coating film 20 entirely covers the body portion 2 and the base 10. However, this should not be construed in a limiting sense, and the coating film 20 may be located at least on the base 10. The coating film 20 may be located on the body portion 2. When the coating film 20 is located on the upper surface of the base 10, the first surface 6 (see FIG. 1) has high wear resistance and heat resistance. When the coating film 20 is located on the side surface of the base 10, the second surface 7 (see FIG. 1) has high wear resistance and heat resistance.

The coating film 20 may include a metal layer and a hard layer. The metal layer is located between the base 10 and the hard layer. The metal layer has a higher adhesion to the base 10 than to the hard layer. Examples of metal elements having such characteristics include Zr, V, Cr, W, Al, Si, and Y. The metal layer contains at least one metal element among the above-described metal elements.

The hard layer has excellent wear resistance compared with the metal layer. The hard layer may have one or more metal nitride layers. For example, the hard layer may include a plurality of first metal nitride layers and a plurality of second metal nitride layers, with the first metal nitride layers and the second metal nitride layers alternately stacked. The first metal nitride layer is located on the metal layer.

For example, the metal layer may contain Al and Cr. In this case, the first metal nitride layer may contain Al. Specifically, the first metal nitride layer may be an AlTiN layer containing AlTiN, which is a nitride of Al and Ti. The second metal nitride layer may be an AlCrN layer containing AlCrN, which is a nitride of Al and Cr.

In this way, the first metal nitride layer containing the metal contained in the metal layer is located on the metal layer, and thus the adhesion between the metal layer and the hard layer is high. This makes it difficult for the hard layer to peel off from the metal layer, so the durability of the coating film 20 is high.

The first metal nitride layer, that is, the AlTiN layer is excellent in terms of, for example, wear resistance in addition to adhesion to the metal layer described above. The second metal nitride layer, that is, the AlCrN layer, has excellent heat resistance and oxidation resistance, for example. In this manner, the coating film 20 includes the first metal nitride layer and the second metal nitride layer having different compositions from each other, and thus properties such as wear resistance and heat resistance of the hard layer can be controlled. Accordingly, the tool life of the insert 1 can be extended. For example, in the hard layer according to the embodiment, mechanical properties such as adhesion with the metal layer and wear resistance can be improved while excellent heat resistance of AlCrN is maintained.

Specific Configuration of cBN Sintered Compact

Figure 3:
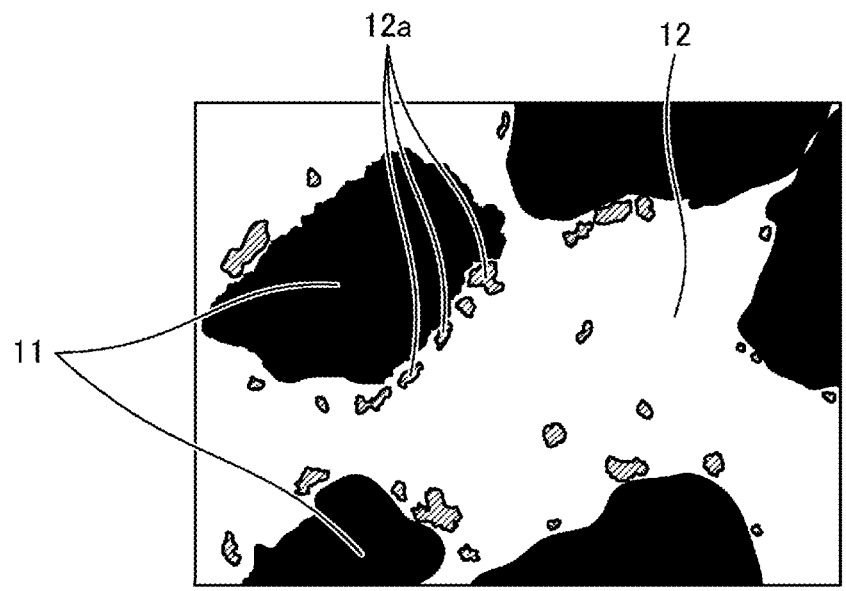
FIG. 3 is a schematic view of a cross-sectional structure of a cBN sintered compact according to the embodiment.

Next, a specific configuration of the cBN sintered compact forming the base 10 will be described. FIG. 3 is a schematic view of a cross-sectional structure of a cBN sintered compact according to the embodiment.

As illustrated in FIG. 3, the base 10 includes a plurality of cBN particles 11 and a binder phase 12. The plurality of cBN particles 11 is bound by the binder phase 12.

It suffices if the cBN particles 11 occupy at least 60% of the cross-sectional area of the base 10. Furthermore, the cBN particles 11 may even occupy 65% or more of the area. The area occupancy of the cBN particles 11 can be determined by analyzing an SEM observation photograph described later, for example.

The binder phase 12 contains a plurality of first ceramic particles 12a. In the embodiment, the first ceramic particles 12a are aluminum nitride (AlN) and aluminum oxide ($Al_2O_3$). The first ceramic particles 12a do not necessarily need to contain both AlN and $Al_2O_3$, and may include at least one of the Al compounds that are AlN and $Al_2O_3$.

The first ceramic particles 12a occupy 4% or more, preferably, 6% or more of the cross-sectional area of the base 10.

In the present specification, the first ceramic particle is assumed to include not only a single Al compound particle, but also an aggregate of the Al compound particles. In other words, an aggregate of Al compound particles is treated as one particle in this specification. A single Al compound particle is an Al compound particle not in contact with other Al compound particles. An aggregate of Al compounds is a collection of a plurality of Al compound particles, that is, a large mass of plurality of Al compound particles gathered.

The binder phase 12 includes a plurality of second ceramic particles, in addition to the first ceramic particles 12a. In the embodiment, the second ceramic particles are titanium nitride (TiN) and titanium diboride (TiB$_2$). The second ceramic particles are not limited to TiN and TiB$_2$.

Each of the first ceramic particles 12a exists in the binder phase 12 as a single particle or as an aggregate of a plurality of particles.

Specifically, a cumulative distribution based on the number of first ceramic particles 12a obtained by particle distribution measurement for the first ceramic particles 12a based on an SEM observation photograph of a cross section (mirror surface) of the base 10 is as follows. Specifically, the proportion of the first ceramic particles 12a with a particle diameter of 0.3 μm or larger is 5% or more, and the proportion of the first ceramic particles 12a with a particle diameter of 0.5 μm or larger is less than 5%.

The Al compounds contained in the binder phase 12, AlN in particular, is known to have relatively inferior mechanical properties compared with other ceramics. The base 10 according to the embodiment contains an Al compound having inferior mechanical properties, but still features excellent mechanical properties, due to the size of the aggregate of the Al compound particles being controlled to fall within the range described above. The base 10 according to the embodiment features small variations in mechanical properties, due to the size of the aggregate of the Al compound particles being controlled to fall within the range described above.

More preferably, the cumulative distribution based on the number of first ceramic particles 12a is as follows. Specifically, the ratio of the first ceramic particles 12a having a particle diameter of 0.3 μm or larger is 7% or more, and the ratio of the first ceramic particles 12a having a particle diameter of 0.5 μm or larger is less than 2%. With the size of the aggregate of the Al compound particles controlled to fall within the range described above, the mechanical properties of the base 10 can be further improved.

Cutting Tool

Figure 4:
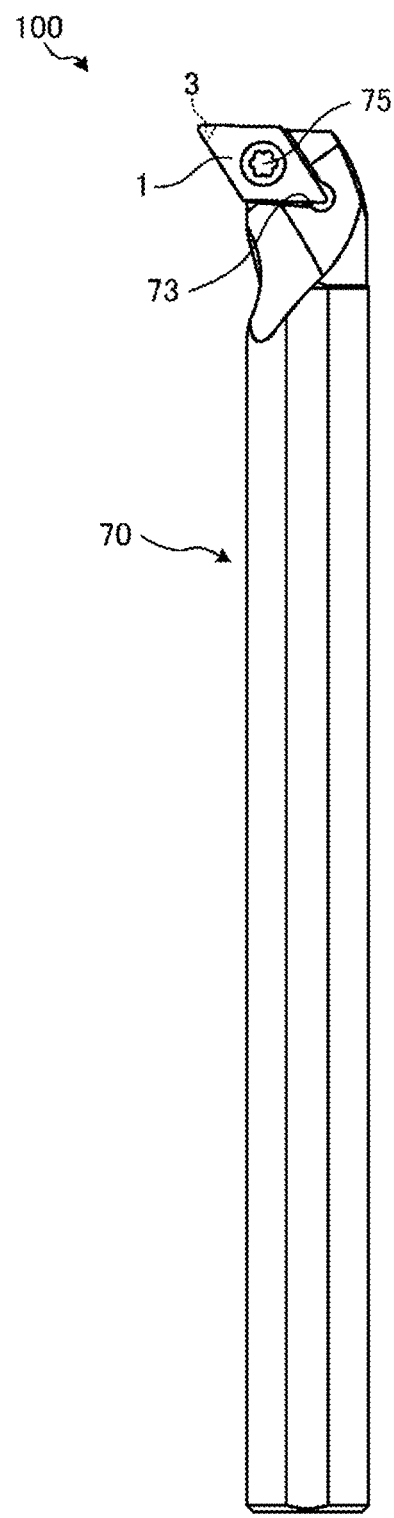
FIG. 4 is a front view illustrating an example of a cutting tool according to the embodiment.

Next, a configuration of a cutting tool including the above-described insert 1 will be described with reference to FIG. 4. FIG. 4 is a front view illustrating an example of a cutting tool according to the embodiment.

As illustrated in FIG. 4, a cutting tool 100 according to the embodiment includes the insert 1 and a holder 70 for fixing the insert 1.

The holder 70 is a rod-shaped member that extends from a first end (an upper end in FIG. 4) toward a second end (a lower end in FIG. 4). The holder 70 is made of, for example, steel or cast iron. In particular, it is preferable to use steel having high toughness among these members.

The holder 70 has a pocket 73 at an end portion on the first end side. The pocket 73 is a portion in which the insert 1 is mounted, and has a seating surface intersecting with the rotation direction of the workpiece and a binding side surface inclined with respect to the seating surface. A screw hole into which a screw 75 described later is screwed is provided on the seating surface.

The insert 1 is located in the pocket 73 of the holder 70, and is mounted on the holder 70 by the screw 75. That is, the screw 75 is inserted into the through hole 5 of the insert 1, and the tip end of the screw 75 is inserted into the screw hole formed in the seating surface of the pocket 73, and the screw portions are screwed together. Thus, the insert 1 is mounted on the holder 70 such that the cutting edge 8 (see FIG. 1) protrudes outward from the holder 70.

In the embodiment, a cutting tool used for so-called turning processing is exemplified. Examples of the turning processing include boring, external turning, and groove-forming. Note that, a cutting tool is not limited to those used in the turning processing. For example, the insert 1 may be used as a cutting tool used for milling processing.

Next, an example of a manufacturing method of the insert 1 according to the embodiment will be described. Note that the manufacturing method of the insert 1 is not limited to the method described below.

First of all, 72 to 82 vol % of TiN raw powder, 13 to 23 vol % of Al raw powder, and 1 to 11 vol % of Al$_2$O$_3$ raw powder are prepared. Then, an organic solvent is added to each raw powder prepared. As the organic solvent, alcohols such as acetone and isopropyl alcohol (IPA) may be used. Then, the resultant mixture is milled and mixed for 20 to 24 hours in a ball mill. After the milling and mixing, the solvent is evaporated, whereby first mixture powder is produced.

Next, cBN powder having an average particle diameter of 2.5 to 4.5 μm and cBN powder having an average particle diameter of 0.5 to 1.5 μm are mixed with a volume ratio of 8:2 to 9:1. An organic solvent is further added. As the organic solvent, alcohols such as acetone and IPA may be used. Then, the resultant mixture is milled and mixed for 20 to 24 hours in a ball mill. After the milling and mixing, the solvent is evaporated, whereby second mixture powder is produced.

The resulting first mixture powder and second mixture powder are mixed in a volume ratio of 68%:32% to 78%:22%. Organic solvent and organic binder are added to the mixture powder. As the organic solvent, alcohols such as acetone and IPA may be used. As the organic binder paraffin, acrylic resin, or the like may be used. The mixture is pulverized in the ball mill for 20 to 24 hours, and then the organic solvent is evaporated, whereby third mixture powder is produced. Note that a dispersant can be added as necessary in the step using the ball mill.

The third mixture powder is molded into a molded object of a predetermined shape. A known method such as uniaxial pressing or cold isostatic pressing (CIP) may be used for the molding. The molded object is heated at a predetermined temperature in a range from 500 to 1000° C., whereby the organic binder is evaporated and removed.

Next, the molded object is put to an ultra-high pressure heating device, to be heated at 1200 to 1500° C. for 15 to 30 minutes under a pressure of 4 to 6 GPa. As a result, the cBN sintered compact according to the embodiment is yielded.

EXAMPLES

Hereinafter, examples of the present disclosure will be described; however, the present disclosure is not limited to the following examples.

First of all, TiN raw powder, Al raw powder, and Al$_2$O$_3$ raw powder were prepared. These kinds of raw powder prepared and a solvent that is acetone were mixed at a predetermined ratio, and then the solvent was evaporated. As a result, the first mixture powder was produced. These kinds of raw powder were mixed using a ball mill. The pulverizing and mixing time using the ball mill was 20 to 24 hours.

Next, the cBN powder having an average particle diameter of 3.5 μm and the cBN powder having an average particle diameter of 1.0 μm were mixed at a volume ratio of 9:1, and then a solvent, which is acetone, was further added as a solvent. The resultant mixture was dried and the second mixture powder was produced. Then, the first mixture powder and the second mixture powder produced as well as a solvent, which is acetone, and an organic binder were pulverized and mixed in a ball mill for 20 to 24 hours. Thereafter, the solvent was evaporated, whereby the third mixture powder was produced. Then, the third mixture powder was molded into a molded object of a predetermined shape. The molded object was heated at a predetermined temperature in a range from 500 to 1000° C. for degreasing. Note that a dispersant is added in the step using the ball mill.

Next, the molded object was put in an ultra-high pressure heating device, to be heated at 1300° C. for 15 minutes under a pressure of 4.5 GPa. As a result, the cBN sintered compact according to each of the examples was yielded.

The manufacturing method will be described more in detail below. The first mixture powder was prepared by mixing the TiN raw powder, the Al raw powder, and $Al_2O_3$ in a volume ratio of 77%:18%:6%. Then, the first mixture powder thus prepared and the second mixture powder were mixed in a volume ratio of 73:27, to yield a cBN sintered compact. This sample is referred to as "Sample No. 1".

The first mixture powder was prepared by mixing the TiN raw powder, the Al raw powder, and $Al_2O_3$ in a volume ratio of 76%:13%:11%. Then, the first mixture powder thus prepared and the second mixture powder were mixed in a volume ratio of 73:27, to yield a cBN sintered compact. This sample is referred to as "Sample No. 2". Sample No. 1 and Sample No. 2 correspond to examples of the cBN sintered compact according to the present disclosure.

In the following, a commercially available cBN sintered compact is referred to as "Sample No. 3". A comparative product is referred to as "Sample No. 4". Sample No. 3 and Sample No. 4 correspond to comparative examples for the cBN sintered compact according to the present disclosure. Sample No. 1 and Sample No. 2 are different from the comparative product in raw material. Specifically, for Sample No. 1 and Sample No. 2, the metal Al powder was used as raw powder, whereas AlN powder was used for the comparative product.

Figure 5:
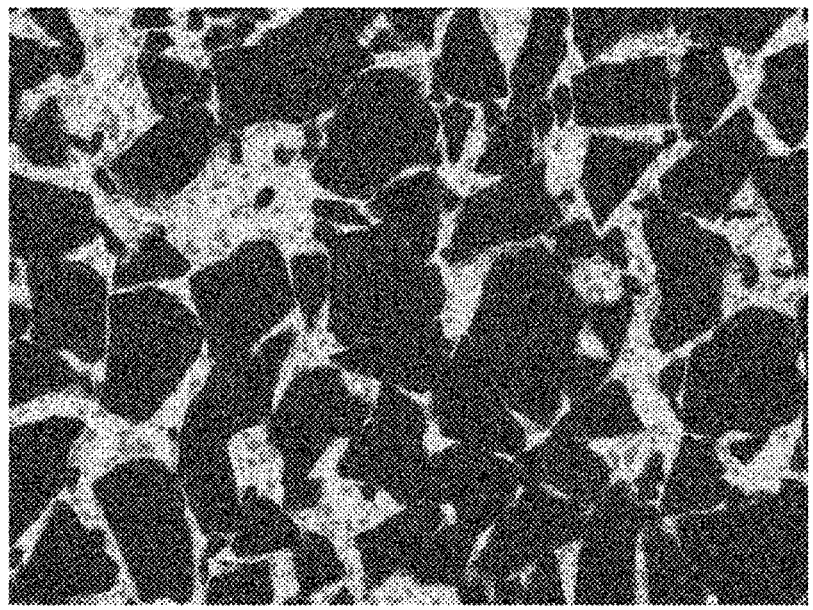
FIG. 5 is an SEM observation photograph of Sample No. 1.
Figure 7:
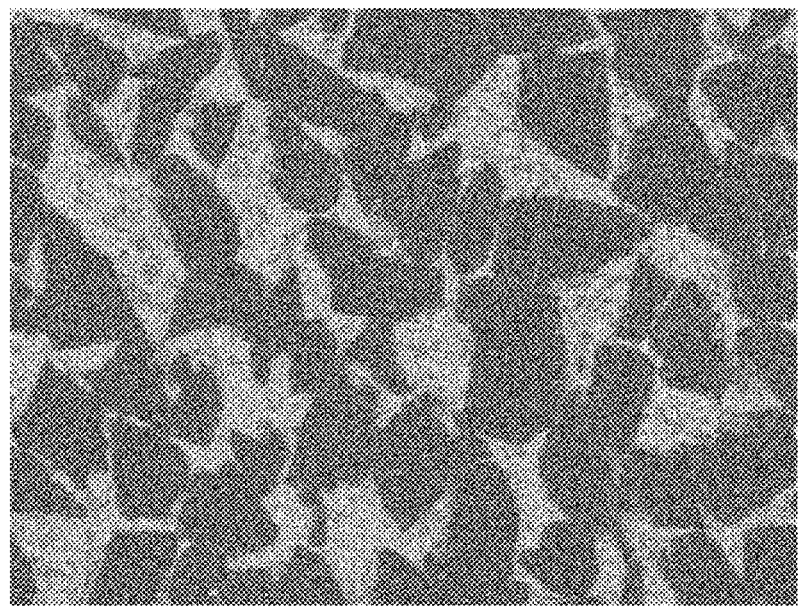
FIG. 7 is an SEM observation photograph of Sample No. 2.
Figure 9:
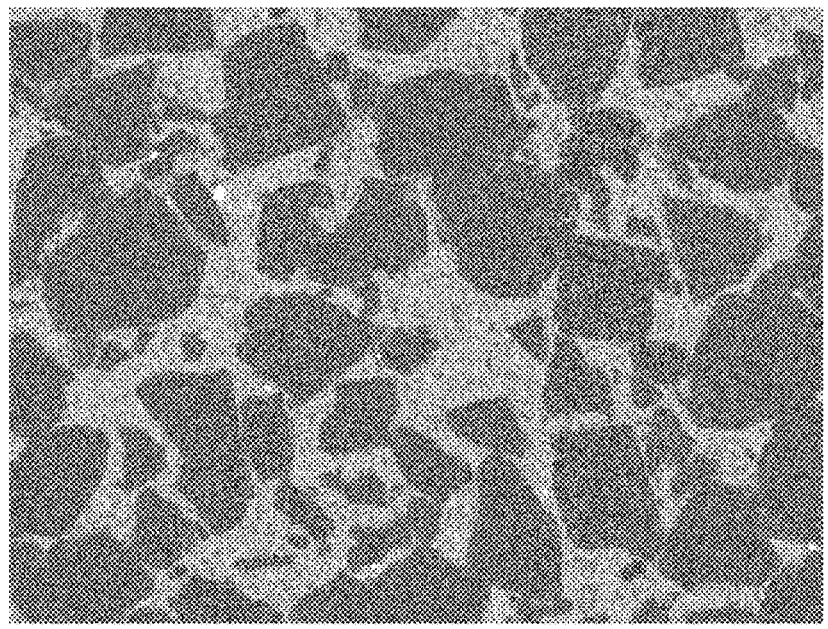
FIG. 9 is an SEM observation photograph of Sample No. 3.
Figure 11:
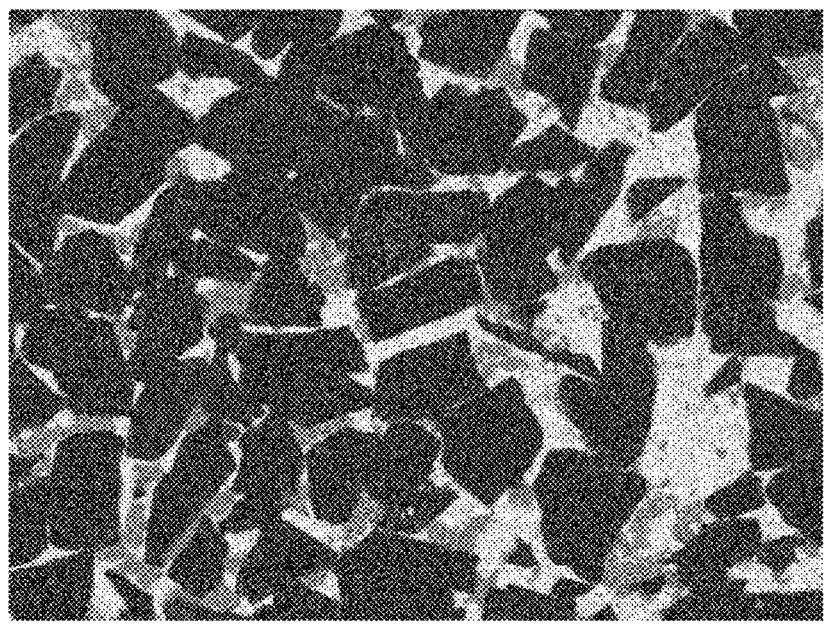
FIG. 11 is an SEM observation photograph of Sample No. 4.

Samples No. 1 to No. 4 were subjected to observation on mirror-polished cross sections thereof. The observation was performed using Field Emission Scanning Electron Microscope (FE-SEM) with acceleration voltage of 5 kV, irradiation current of 3 nA, and magnification of x5000. The device used was JSM-7100 F manufactured by JEOL Ltd. FIG. 5 is an SEM observation photograph of Sample No. 1. FIG. 7 is an SEM observation photograph of Sample No. 2. FIG. 9 is an SEM observation photograph of Sample No. 3. FIG. 11 is an SEM observation photograph of Sample No. 4.

Based on these SEM observation photographs, Al compound particle distribution measurement was performed on a cross section of each of the samples described above. The particle distribution measurement was performed through the following procedure.

First of all, the SEM observation photographs were input to image analysis software "ImageJ" (1.52e). Then, a histogram of white black contrast tone was obtained using ImageJ. Color tone was divided into 256. In the histogram, the horizontal axis represents color tone, and the vertical axis represents the number of pixels providing each color tone. Therefore, a large value on the vertical axis indicates a large number of pixels providing the corresponding color tone.

Figure 13:
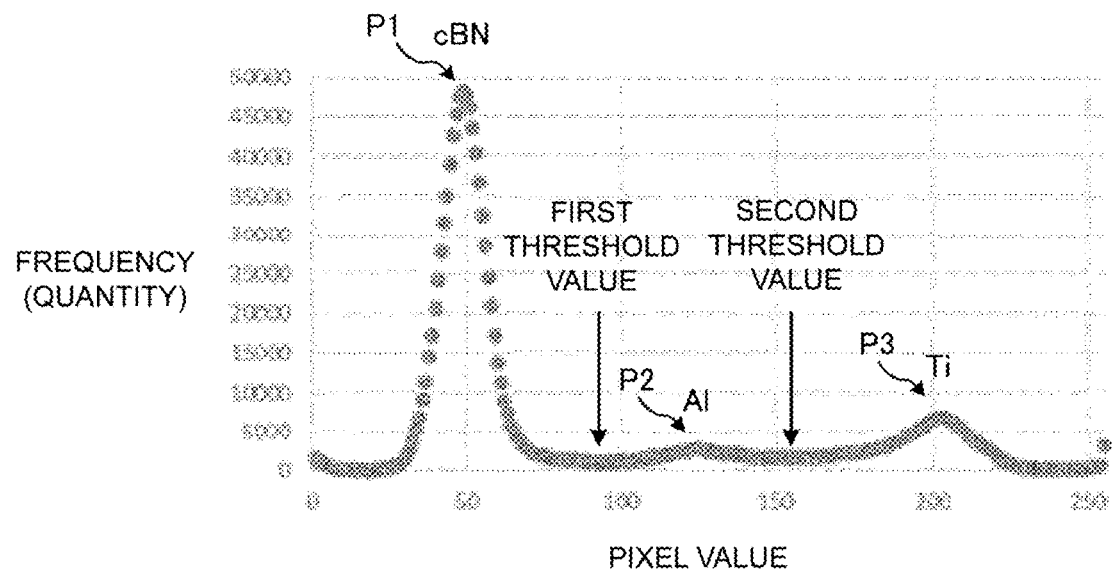
FIG. 13 is a diagram illustrating an example of a histogram extracted using ImageJ.

FIG. 13 is a diagram illustrating an example of the histogram extracted using ImageJ. There are three peaks in the histogram illustrated in FIG. 13. Of these three peaks, the first peak P1 located on the leftmost side is from the cBN, the second peak P2 located in the middle is from Al, and the third peak P3 located at the rightmost side is from Ti. It can be understood from FIG. 13 that in a cross section of the cBN sintered compact, the cBN particles occupy the largest area, a Ti based binder phase occupies the second largest area, and the first ceramic particles occupy the smallest area.

A substance corresponding to each peak can be identified using energy dispersive X-ray spectrometer (EDS), for example.

Figure 14:
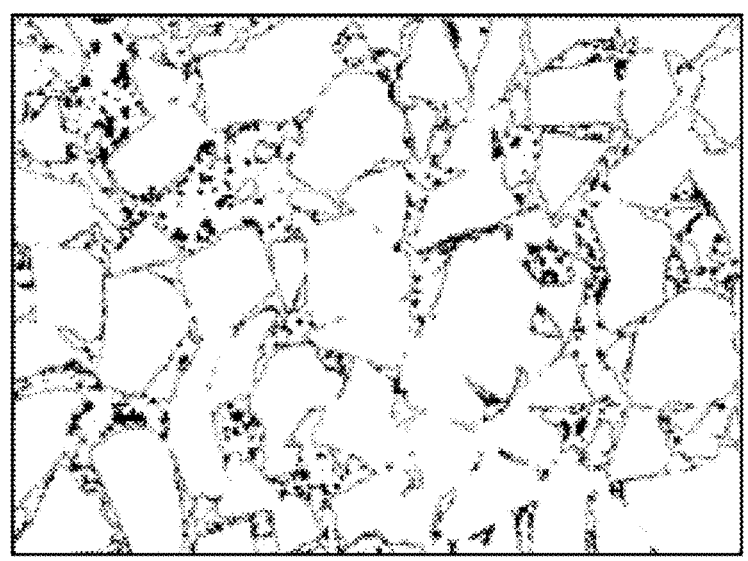
FIG. 14 is an example of an image obtained by binarizing an SEM observation photograph.

Next, it was determined that the minimum value of frequencies between the first peak and the second peak should be a first threshold, and the minimum value of frequencies between the second peak and the third peak should be a second threshold. The SEM observation photograph was then binarized using the first threshold and second threshold thus determined. Specifically, the pixel values of pixels not less than the first threshold value and not more than the second threshold value were converted to 255, and the pixel values of pixels less than the first threshold and more than the second threshold were converted to 0. FIG. 14 is an example of an image obtained by binarizing an SEM observation photograph. In other words, in FIG. 14, pixels with pixel values not less than the first threshold and not more than the second threshold are displayed in black, and pixels with pixel values less than the first threshold and more than the second threshold are displayed in white.

Figure 6:
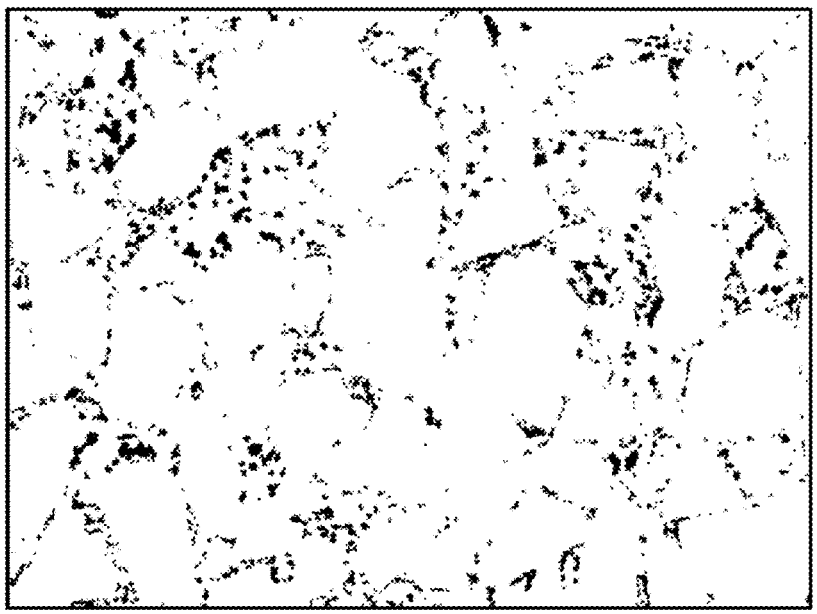
FIG. 6 is an image in which a portion corresponding to an Al compound is extracted from the SEM observation image illustrated in FIG. 5, and is displayed in black.
Figure 8:
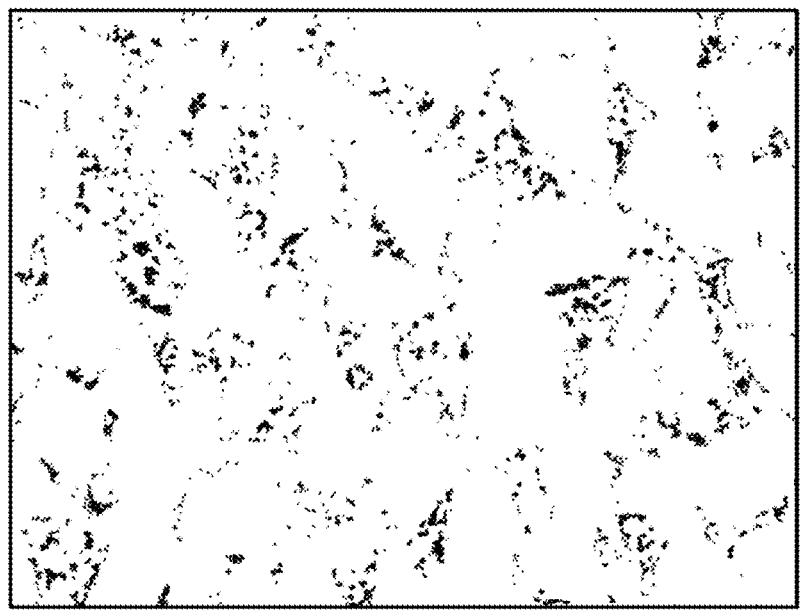
FIG. 8 is an image in which a portion corresponding to an Al compound is extracted from the SEM observation image illustrated in FIG. 7, and is displayed in black.
Figure 10:
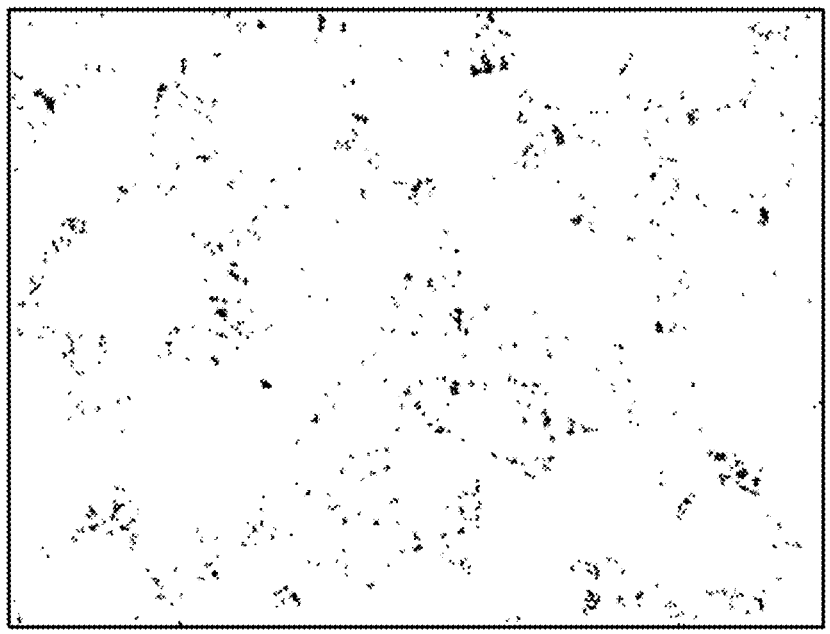
FIG. 10 is an image in which a portion corresponding to an Al compound is extracted from the SEM observation image illustrated in FIG. 9, and is displayed in black.
Figure 12:
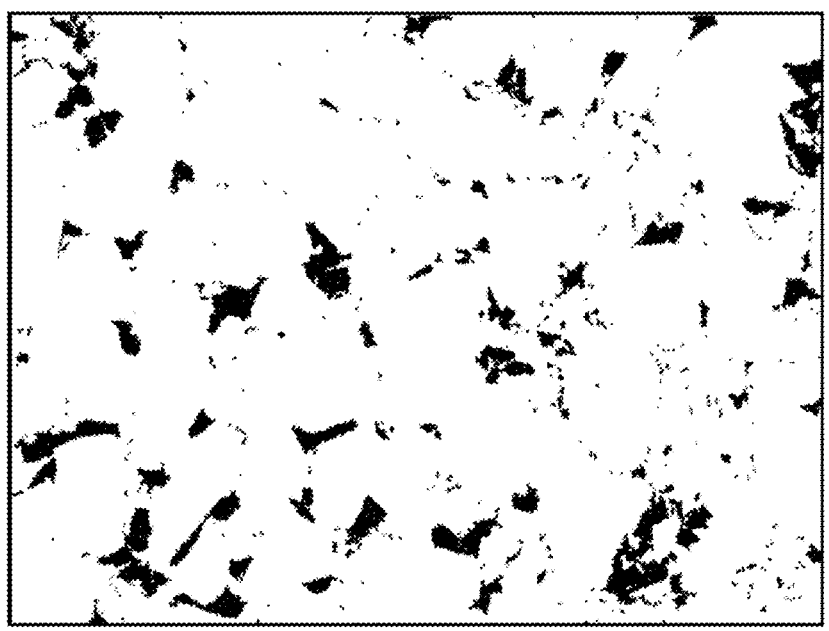
FIG. 12 is an image in which a portion corresponding to an Al compound is extracted from the SEM observation image illustrated in FIG. 11, and is displayed in black.

Next, information on the interface between the cBN particle and the binder phase was deleted from the binarized image. Specifically, of the pixels (black pixels) with the pixel values "255" in the binarized image, black pixels not connected to other black pixels to form two or more connected black pixels were deleted from the binarized image. FIGS. 6, 8, 10, and 12 illustrate the images thus obtained. FIG. 6 is an image in which a portion corresponding to the Al compound is extracted from the SEM observation image illustrated in FIG. 5, and is displayed in black. FIG. 8 is an image in which a portion corresponding to the Al compound is extracted from the SEM observation image illustrated in FIG. 7, and is displayed in black. FIG. 10 is an image in which a portion corresponding to an Al compound is extracted from the SEM observation image illustrated in FIG. 9, and is displayed in black. FIG. 12 is an image in which a portion corresponding to an Al compound is extracted from the SEM observation image illustrated in FIG. 11, and is displayed in black. In other words, the first ceramic particles exit at black points in FIG. 6, FIG. 8, FIG. 10, and FIG. 12.

Deleting the information on the interface between the cBN particles and the binder phase means deleting information on the black pixel not connected to two or more black pixels to form two or more connected black pixels. One pixel corresponds to 0.027 μm. Thus, the images illustrated in FIGS. 6, 8, 10, and 12 do not include information on the first ceramic particles having a particle diameter of approximately 0.05 μm or less.

Next, from the images illustrated in FIGS. 6, 8, 10, and 12, the information on the area of each of the first ceramic particles in the cross section was acquired. Information on an area percentage of the first ceramic particles (the ratio of the area of the first ceramic particles to the cross-sectional area) was acquired based on the acquired area information.

The particle diameter of each of the first ceramic particles was calculated based on the area information on the first ceramic particles acquired. Specifically, the particle diameter of the particles was calculated assuming that the acquired area information is information on an area of a circle. Then, through arithmetically averaging the particle diameters of the first ceramic particles, an average particle diameter of the first ceramic particles was determined. That is, the average particle diameter is determined with what is known as an equivalent circle diameter.

When there is the aggregate of the first ceramic particles, information on the area of each of the first ceramic particles forming the aggregate is not acquired. Instead, information on the area of the aggregate is acquired. Thus, the particle diameter of the first ceramic particles used in the present disclosure means a particle diameter of a single first ceramic particle for a first ceramic particle existing as a single particle, and for an aggregate of the first ceramic particles, means a particle diameter of a single particle with a plurality of first ceramic particles forming the aggregate regarded as the single particle.

Figure 15:
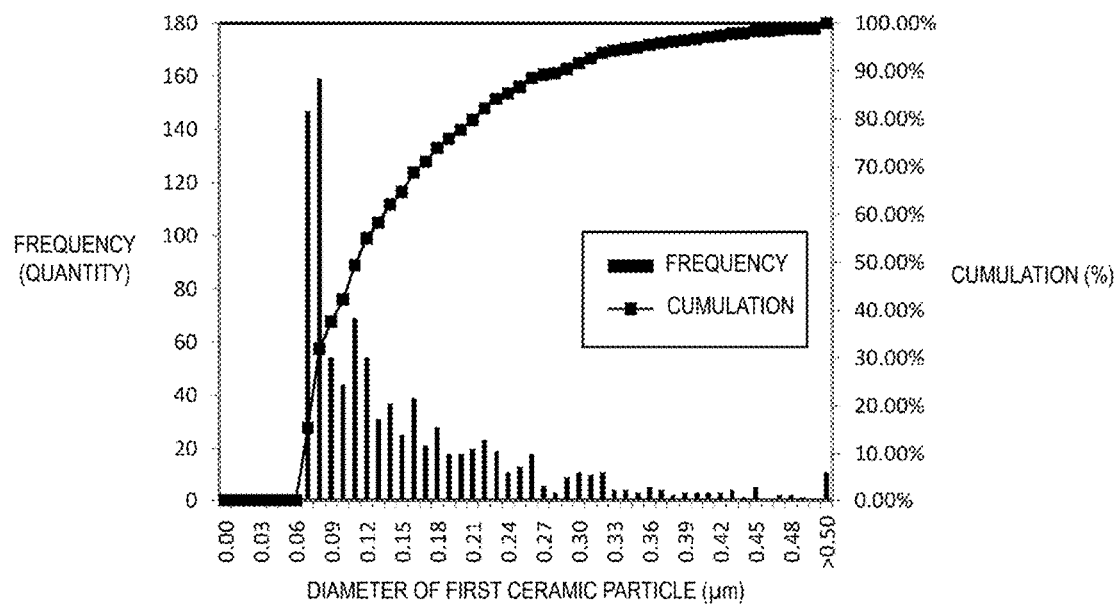
FIG. 15 is a graph illustrating a particle distribution of first ceramic particles in Sample No. 1.
Figure 16:
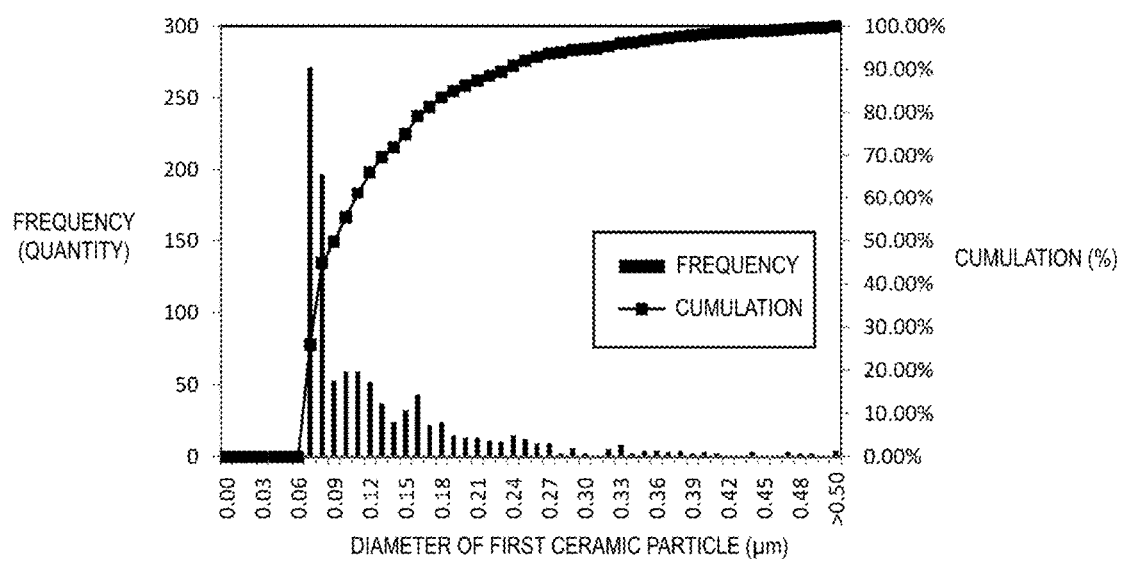
FIG. 16 is a graph illustrating a particle distribution of the first ceramic particles in Sample No. 2.
Figure 17:
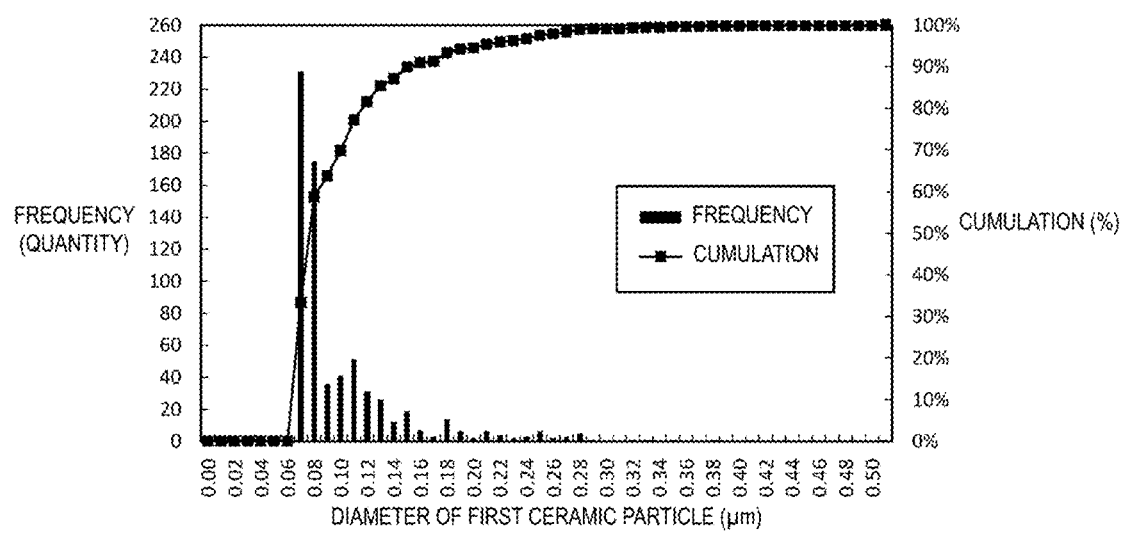
FIG. 17 is a graph illustrating a particle distribution of the first ceramic particles in Sample No. 3.
Figure 18:
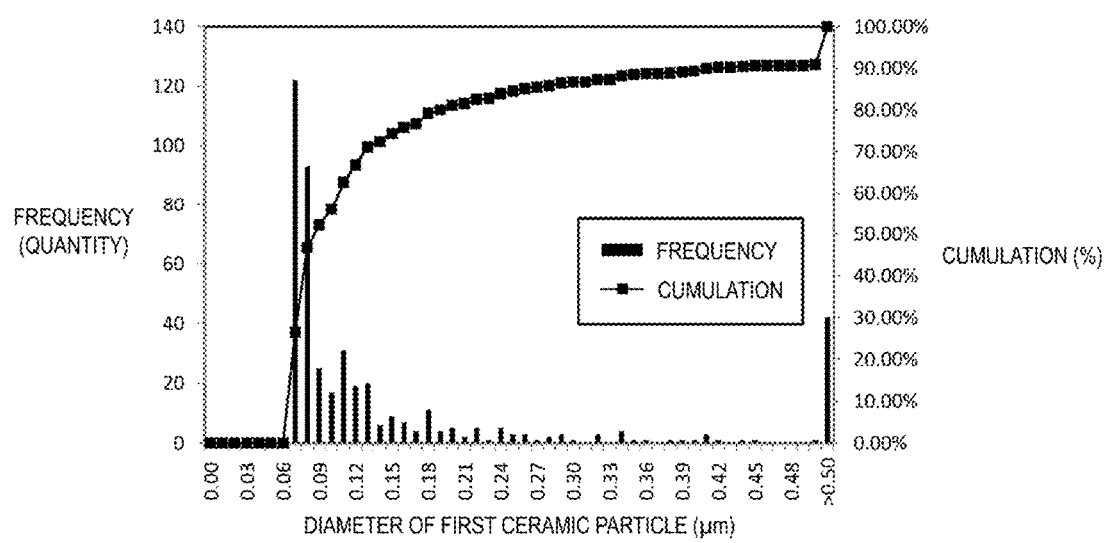
FIG. 18 is a graph illustrating a particle distribution of the first ceramic particles in Sample No. 4.

A graph (histogram) of a particle distribution in increments of 0.01 μm was generated using the information on the average particle diameter of the first ceramic particles determined. FIGS. 15 to 18 illustrate the histograms thus generated. FIG. 15 is a graph illustrating a particle distribution of the first ceramic particles in Sample No. 1. FIG. 16 is a graph illustrating a particle distribution of the first ceramic particles in Sample No. 2. FIG. 17 is a graph illustrating a particle distribution of the first ceramic particles in Sample No. 3. FIG. 18 is a graph illustrating a particle distribution of the first ceramic particles in Sample No. 4.

In the graphs in FIGS. 15 to 18, a frequency distribution (histogram) and a cumulative distribution (minus sieve) are illustrated for the particle diameter of the first ceramic particles. In the graphs in FIGS. 15 to 18, the horizontal axis represents the particle diameter (μm) of the first ceramic particles (illustrated as "diameter of first ceramic particle (μm)" in the figure), and the vertical axis represents the frequency (quantity) and cumulation (%). This "frequency" indicates the number of first ceramic particles present in each particle diameter section. This "cumulation" indicates the ratio of the number of particles of a predetermined particle diameter or less to the total number of particles. Note that, in FIGS. 15 to 18, the value on the vertical axis corresponding to ">0.50 (μm)" of the horizontal axis indicates the frequency (quantity) and cumulation (%) of the first ceramic particles having a particle diameter greater than 0.50 μm.

In the graphs illustrated in FIGS. 15 to 18, an aggregate of first ceramic particles is counted as a single particle. As described above, the graphs illustrated in FIGS. 15 to 18 do not include information on the first ceramic particles having a particle diameter of 0.05 μm or less.

Based on the cumulative distribution in the graphs illustrated in FIGS. 15 to 18, for Samples No. 1 to No. 4, a ratio of the first ceramic particles having a particle diameter not smaller than 0.3 μm to the total number of particles of the Al compound was acquired. Specifically, the ratio of the first ceramic particles having a particle diameter not smaller than 0.3 μm to the total number of particles is a value calculated by subtracting the cumulation (%) corresponding to the particle diameter 0.3 μm from 100(%). Similarly, for each sample, the ratio of the first ceramic particles having a particle diameter of 0.5 μm or larger to the total number of particles was acquired.

FIG. 19 is a table showing results of analyzing the cross-sectional structure of each sample. In FIG. 19, "average particle diameter (μm)" indicates the average particle diameter of the first ceramic particles, the "area percentage (%)" is the area percentage of the first ceramic particles, and "cBN area ratio (%)" is the area percentage of the cBN particles. In FIG. 19, "cumulation of 0.3 μm or larger" indicates the ratio of the first ceramic particles having a particle diameter of 0.3 μm or larger to the total number of particles, and "cumulation of 0.5 μm or larger" indicates the ratio of the first ceramic particles having a particle diameter of 0.5 μm or larger to the total number of particles.

The average particle diameters of Samples No. 1 to No. 4 were 0.15 μm, 0.12 μm, 0.10 μm, and 0.18 μm, respectively. Thus, the average particle diameters of Samples No. 1 and No. 2, which are examples, were larger than that of Sample No. 3, which is a comparative example, and smaller than that of Sample No. 4, which is a comparative example. This is also clearly illustrated in FIGS. 6, 8, 10, and 12. In other words, as is clear from FIGS. 6, 8, and 10, the first ceramic particles contained in Sample No. 1 (see FIG. 6) and Sample No. 2 (see FIG. 8) have a larger particle diameter as a whole than the first ceramic particles contained in Sample No. 3 (see FIG. 10). As is clear from FIGS. 6, 8, and 12, the first ceramic particles contained in Sample No. 1 and Sample No. 2 have a smaller particle diameter as a whole than the first ceramic particles contained in Sample No. 4 (see FIG. 12).

The area percentages of Samples No. 1 to No. 4 were 6.065%, 4.553%, 2.892%, and 8.345%, respectively. As described above, the data on the particle distribution illustrated in FIGS. 15 to 18 do not include information on the first ceramic particles having a particle diameter of 0.05 μm or less. Sample No. 3 with the smallest average particle diameter is most affected by this. The area percentage of Sample No. 3 is actually higher than 2.892% and is expected to be substantially the same as that of Sample No. 1. If that is the case, the area percentage of Sample No. 1 is substantially the same as that of Sample No. 3, meaning that the average particle diameter of Sample No. 1 is larger. This means that Sample No. 1 has a larger number of first ceramic particles aggregated than Sample No. 3. Since the first ceramic particles are aggregated, it can be regarded that particles tend to be relatively separated from each other. The first ceramic particles have a low strength compared with TiN. Thus, when the distance between the first ceramic particles is short, cracks are likely to propagate through the first ceramic particles. In this context, Sample No. 1 features a relatively long distance between the first ceramic particles, cracks propagating through the first ceramic particles are less likely to be produced. Thus, the cBN sintered compact according to Sample No. 1 that is one of the examples can be regarded as featuring high mechanical properties.

The cBN area ratio of Sample No. 1, Sample No. 2, Sample No. 3, and Sample No. 4 were 68.1%, 71.1%, 70.7%, and 69.2%, respectively.

Cumulation of 0.3 μm or larger of Sample No. 1, Sample No. 2, Sample No. 3, and Sample No. 4 were 10.8%, 5.5%, 0.87%, and 13.5%, respectively. Thus, cumulation of 0.3 μm or larger according to Sample No. 1 and Sample No. 2 was greater than that according to Sample No. 3. This means that Sample No. 1 and Sample No. 2 include a higher ratio of the first ceramic particles having the particle diameter of 0.3 μm than that in Sample No. 3. Also clear from this result, Sample No. 3 included almost no first ceramic particles having a particle diameter of 0.3 μm or larger.

Cumulation of 0.3 μm or larger of Sample No. 1 and Sample No. 2 was smaller than that according to Sample No. 4. This means that Sample No. 1 and Sample No. 2 include a higher ratio of the first ceramic particles having the particle diameter of 0.3 μm than that in Sample No. 4.

Cumulation of 0.5 μm or larger of Sample No. 1, Sample No. 2, Sample No. 3, and Sample No. 4 were 1.6%, 0.4%, 0.14%, and 9.3%, respectively.

Next, a cutting test was performed using each of the samples, and wear resistance and stability were evaluated under the following cutting conditions. The results are illustrated in FIG. 20. FIG. 20 is a table showing the results of evaluating wear resistance and stability for each sample.

Cutting Condition
(Wear Resistance Evaluation Test)
Cutting method: turning/external turning
Workpiece: SCM415 (carburized hardening material)
Cutting Speed: 150 m/min
Feed: 0.1 mm/rev
Depth of Cut: 0.2 mm
Evaluated by: time required for reaching the wear amount of 0.15 mm, or time when the evaluation was determined to be stopped from a cutting edge state
(Stability Evaluation Test)
Cutting method: turning/end face processing
Workpiece: SCM415 (carburized) 8 holes (φ10)
Cutting Speed: 150 m/min
Feed: 0.2 mm/rev
Depth of Cut: 0.2 mm
Evaluated by: the number of impacts of causing defect on cutting edge As illustrated in FIG. 20, both wear resistance and stability of Sample No. 1, which is one of the examples, were higher than those of Sample No. 3 and Sample No. 4, which are the comparative examples. The wear resistance and the stability of Sample No. 1 were higher than that of Sample No. 2, which is one of the examples. Both wear resistance and stability of Sample No. 2, which is one of the examples, were higher than those of Sample No. 4, which is one of the comparative examples. Both wear resistance and stability of Sample No. 2, which is one of the examples, were higher than those of Sample No. 3, which is one of the comparative examples.

As described above, the cBN sintered compact according to each of the examples contains the Al compound particles with inferior mechanical properties, but the size of the Al compound particles are controlled to be within an appropriate range, and thus features excellent mechanical properties with small variations.

As described above, the insert according to embodiments (the insert 1, for example) includes the cBN sintered compact in which a plurality of cBN particles (the cBN particles 11, for example) is bound via the binder phase (the binder phase 12, for example). The plurality of cBN particles occupies 60% or more of the cross-sectional area of the cBN sintered compact. The binder phase contains Al compound particles containing at least one of AlN or $Al_2O_3$. A particle distribution of the Al compound particles in a cumulative distribution based on the number of the Al compound particles in a cross section of the cBN sintered compact is as follows. Specifically, the proportion of the Al compound particles with the particle diameter of 0.3 μm or larger is 5% or more, and the proportion of the Al compound particles with the particle diameter of 0.5 μm or larger is less than 5%.

A particle distribution of the Al compound particles in a cumulative distribution based on the number of the Al compound particles in a cross section of the cBN sintered compact is as follows. Specifically, the proportion of the Al compound particles with the particle diameter of 0.3 μm or larger is 7% or more, and the proportion of the Al compound particles with the particle diameter of 0.5 μm or larger is less than 1%.

The insert according to the embodiment contains an Al compound particles having poor mechanical properties, but still features excellent mechanical properties, due to the size of the aggregate of the Al compound particles being controlled to fall within the range described above. The insert according to the embodiment features small variations in mechanical properties, due to the size of the aggregate of the Al compound particles being controlled to fall within the range described above.

The insert according to the embodiment may include the coating film (the coating film 20, for example) located on the cBN sintered compact. With the coating film, the wear resistance and heat resistance can be further improved.

In the embodiment described above, the shape of the upper surface and the lower surface of the cutting tool 100 is a parallelogram as an example, but the shape of the upper surface and the lower surface of the cutting tool 100 may be diamond, square, or the like. Additionally, the shape of the upper surface and the lower surface of the cutting tool 100 may be triangular, pentagonal, hexagonal, etc.

The shape of the cutting tool 100 may be of a positive type or negative type. The positive type is a type in which the side surface is inclined with respect to the central axis passing through the center of the upper surface and the center of the lower surface of the cutting tool 100, and the negative type is a type in which the side surface is parallel to the central axis described above.

Further effects and variations can be readily derived by those skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

REFERENCE SIGNS

1 Insert
2 Body portion
4 Seat
5 Through hole
6 First surface
7 Second surface
8 Cutting edge
10 Base
11 cBN particle
12 Binder phase
12a First ceramic particles
20 Coating film
30 Substrate
40 Bonding material
70 Holder
73 Pocket
75 Screw
100 Cutting tool

The invention claimed is:

1. An insert comprising a cBN sintered compact comprising cBN particles and a binder phase binding the cBN particles, wherein
the cBN particles occupy 60% or more of an area in a cross section of the cBN sintered compact,
the binder phase contains Al compound particles containing at least one of AlN or $Al_2O_3$, and
according to a particle distribution of the Al compound particles in a cumulative distribution based on the number of the Al compound particles in the cross section of the cBN sintered compact,
a proportion of ones of the Al compound particles with a particle diameter of 0.3 μm or larger is 5% or more, and
a proportion of ones of the Al compound particles with a particle diameter of 0.5 μm or larger is less than 5%.

2. The insert according to claim 1, wherein
according to the particle distribution of the Al compound particles in the cumulative distribution based on the number of the Al compound particles in the cross section of the cBN sintered compact,
the proportion of the ones of the Al compound particles with the particle diameter of 0.3 μm or larger is 7% or more, and
the proportion of the ones of the Al compound particles with the particle diameter of 0.5 μm or larger is less than 2%.

3. The insert according to claim 1, further comprising a coating film located on the cBN sintered compact.

4. A cutting tool comprising:
a holder having a rod-shape and comprising a pocket at an end portion of the rod-shaped holder; and
the insert according to claim 1 located in the pocket.

5. The insert according to claim 1, wherein
the Al compound particles comprise an aggregate of the Al compound particles.

6. The insert according to claim 1, wherein
the binder phase further contains TiN compound particles or $TiB_2$ compound particles.

* * * * *